UNITED STATES PATENT OFFICE.

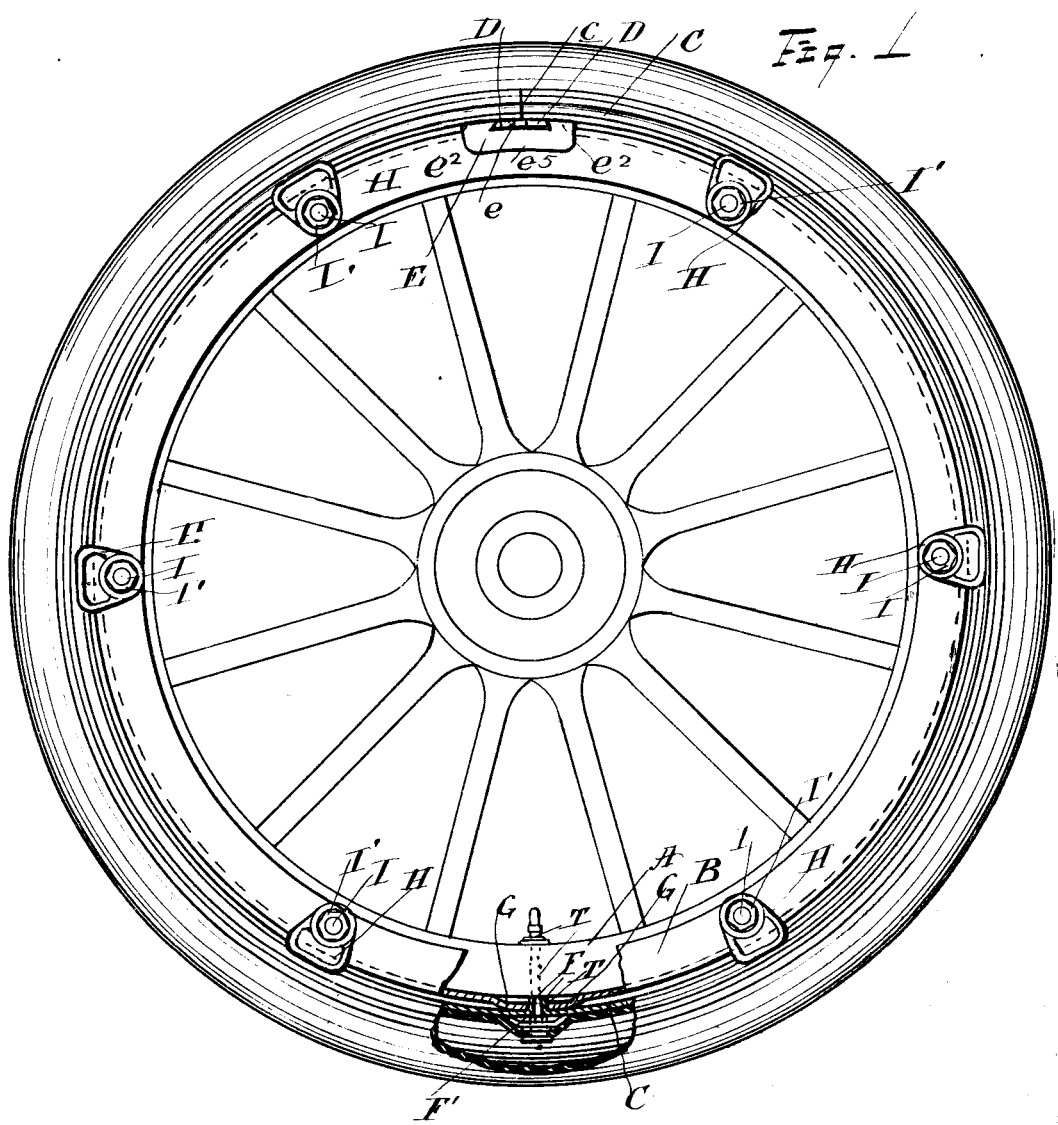

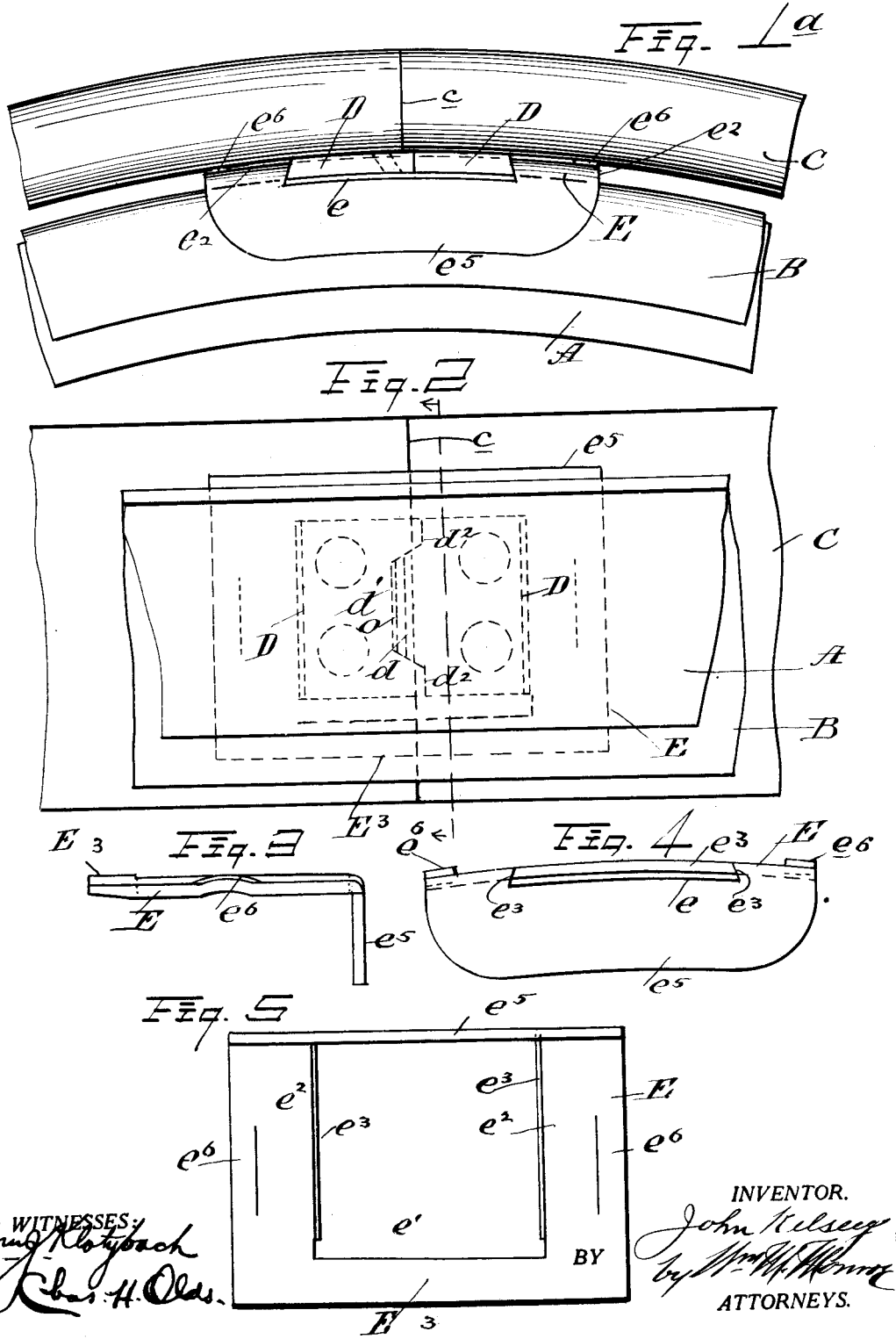

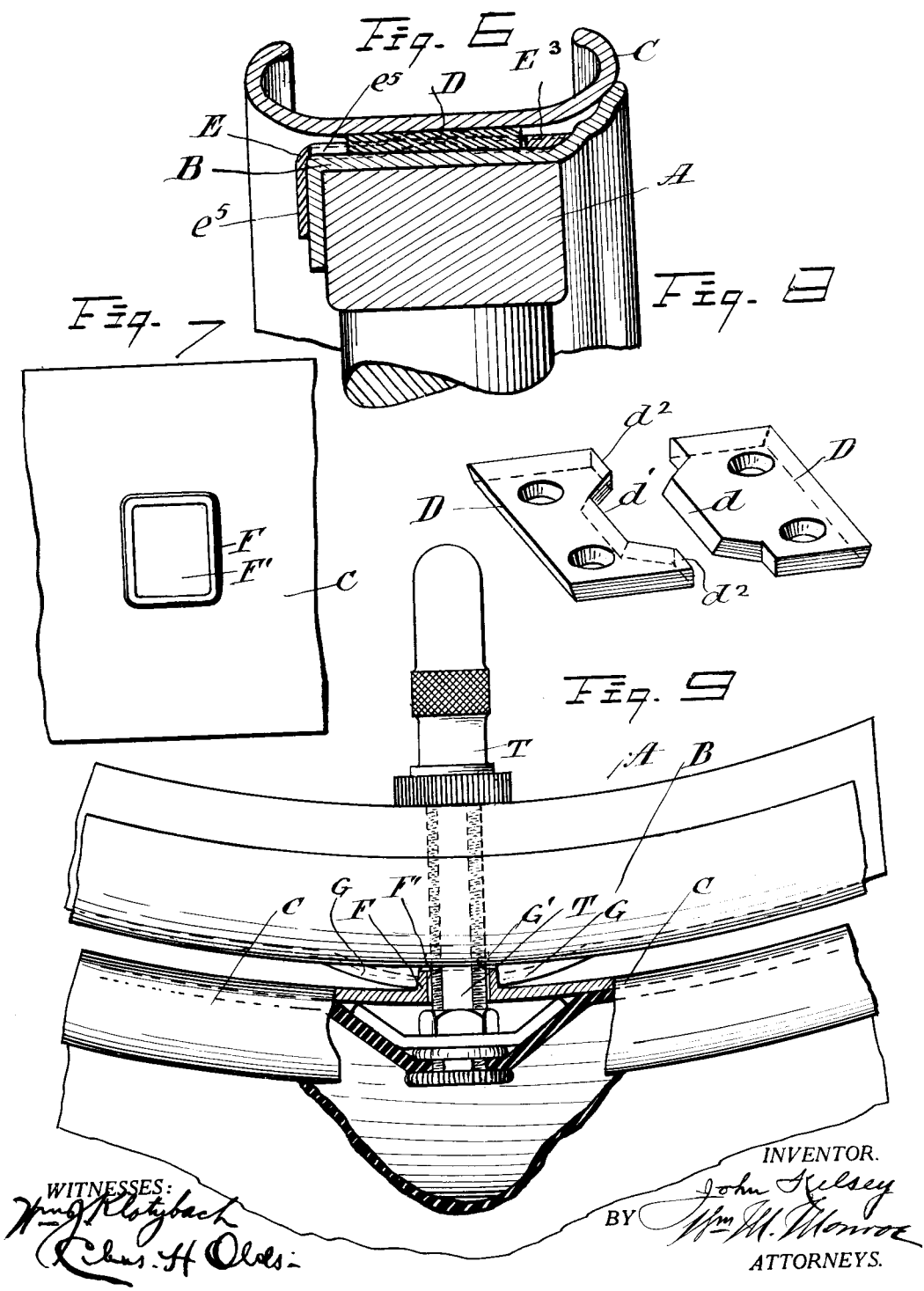

JOHN KELSEY, OF DETROIT, MICHIGAN.

RIM-HOLDING DEVICE.

1,181,670.     Specification of Letters Patent.     Patented May 2, 1916.

Application filed August 29, 1914. Serial No. 859,256.

*To all whom it may concern:*

Be it known that I, JOHN KELSEY, a citizen of the United States, and resident of Detroit, in the county of Wayne and State of Michigan, have invented certain new and useful Improvements in Rim-Holding Devices, of which I hereby declare the following to be a full, clear, and exact description, such as will enable others skilled in the art to which it appertains to make and use the same.

The invention has reference to the type of split rim upon which a penumatic tire is secured and the extremities of the rim are locked together before the parts are assembled upon the felly band of an automobile wheel.

The invention has particular reference to means for retaining the extremities of the rim in place when the tire is deflated when upon the felly band, but permitting them to be released from contact with each other when the rim is removed from the felly band, so that the rim can be collapsed to remove the tire therefrom and to mount the tire in its place.

The invention also includes means upon said rim and the felly band for driving the rim, said driving means including centering means and means for spacing the rim correctly in concentric relation to the felly band. The aforesaid securing or locking means for the extremities of the rim serve to space the rim and felly band apart at a point diametrically opposite the combined driving and centering means, and a series of wedging clamps spaced between said rim and felly serve to maintain the proper distance between them in the remaining portions of the circumference of the felly band.

The invention further comprises the combination and arrangement of parts and construction of the various details, hereinafter described, shown in the accompanying drawings and specifically pointed out in the claims.

In the accompanying drawings Figure 1 is a side elevation of the complete assembled wheel showing the tire and rim and felly band and locking, driving, and centering devices for the rim; Fig. 1ª is an enlarged side elevation of a portion of the felly band and rim extremities showing the locking device for said extremities; Fig. 2 is a plan view of the inner face thereof; Fig. 3 is a side elevation of the independent locking plate; Fig. 4 is a front view thereof; Fig. 5 is a plan view thereof; Fig. 6 is a transverse section on line $a \ldots a$ Fig. 2; Fig. 7 is a plan view of the inside of the rim showing the flanged opening through which the valve is inserted into the rim, said flanges constituting, with projections upon the felly band, the driving means for the rim; Fig. 8 is a perspective view of the interlocking plates upon the rim; Fig. 9 is a longitudinal section of the rim and tire showing the flanges of said valve stem opening interengaging with lugs upon the felly band to form a driving means for the rim.

In these views A is the felly of the wheel, B is the felly band, C is the tire holding rim transversely split at $c$.

D, D, are plates which are riveted upon the extremities of the split rim, one of these plates being provided with a wedge shaped tongue $d$, which enters a recess $d'$ in the other plate to prevent lateral movement of one rim extremity upon the other, and overlaps the split in the rim. In Fig. 8 the inner faces of these plates are shown. The tongue $d$ is shorter than the depth of the recess and hence a narrow opening O is provided into which the point of a tool such as a screw driver can be inserted to force the rim extremities apart. The projecting ends $d^2$ of one of the plates overlap the other extremity of the rim and hence prevents the separation of the rim extremities in a radial direction when the interlocking plates are secured together.

E is an angle plate formed of sheet metal which is open at $e$ at the front side $e^5$ and this opening extends toward the rear at $e'$. In use, when the parts are to be assembled the collapsed tire is placed upon the collapsed rim and the extremities of the rim are brought together. The plate E is then slidingly moved over the plates D, D, and the transverse ends $e^2$, $e^2$ will engage tightly the outer ends of the plates D, D. These ends are dovetailed and the engaging edges $e^3$, $e^3$, of the plate E are correspondingly dovetailed so that the plate E retains the ends of the rim in contact with each other. The plate is provided with a rear side or member $E^3$ which engages the rear sides of the plates D, D, and prevents it from coming off. The plates are made of sufficient thickness to space the rim and felly band properly apart. The transverse sides of the locking plate are also bent upward at $e^6$, $e^6$, to provide a bearing against the rim, so that there will be no loose movement of the plate and all rattling noise will be prevented. This plate cannot be removed until the rim is removed from the felly band.

The other portion of the device, viz. the driving and centering means, and spacing means for the opposite side of the wheel, is placed diametrically opposite the split in the rim and comprises a rectangular flange F which encircles an opening F' in the rim C and through which the valve tube T is inserted. The flange F is tapered upon its outer sides and is engaged upon opposite sides by means of the lugs G, G, upon the felly band. These lugs are conveniently made by striking up integral portions of the band, one on each side of the opening G', for the valve tube. The inner sides of the lugs are slightly inclined to correspond with the taper of the flange and when the flange enters between the lugs the rim will be accurately centered upon the felly band. The lugs upon the felly band engaging the flange described will drive the rim alternately in opposite directions. The height of this flange is sufficient to accurately space the rim and felly band apart.

When assembling the parts and the tire is in place the extremities of the rim are attached together by means of the plate D, the valve tube is then inserted through the opening in the felly band, and the flange passes between the lugs upon the felly band. The opposite edge of the rim is then sleeved over the felly band and the rim is properly spaced in position.

The clamps H, H, spaced about the felly band are secured in place by means of the bolts I, I, and nuts I', I', and the wheel is ready for use.

Having described the invention what I claim as new and desire to secure by Letters Patent is:

1. In combination with a split tire holding rim, interlocking plates thereon, one plate secured to each extremity, and one plate having a tongue and the other a corresponding recess, the edge of said plates overlapping the opposite ends of said rim and a separate plate transversely movable over said interlocking plates, and interlocking with the outer edges thereof.

2. The combination with a transversely split tire holding rim, of locking means for the respective rim extremities, one plate having a projecting and tapered tongue and the other plate having a corresponding recess, the adjoining edges of said plates overlapping the respective opposite ends of said rim, and a plate having a central opening and slidably movable over said interlocking plates, the transverse edges of said opening interlocking with the outer transverse edges of said plates to secure them together.

3. The combination with a felly band and a transversely split tire holding rim, of a projection upon each end of said rim, and a separate locking plate slidably and transversely movable upon said projections, and means upon said locking plate for engaging the outer edges of said projections.

4. The combination with a transverse split tire holding rim, of interlocking plates secured thereto, one plate secured to each rim extremity, the opposite outer transverse edges of said plates being dovetailed, and a separate plate having correspondingly and reversely dovetailed edges, and slidingly movable over said interlocking plates, substantially as described.

5. The combination with a transversely split tire holding rim, of interlocking plates secured to the extremities thereof, each plate overlapping the opposite rim extremity, and one plate having a tongue and the other a corresponding recess, the opposite outer transverse edges of said plates dovetailed, and a separate plate having an opening through which both of said plates are slidingly insertible, the opposite edges of said opening reversely dovetailed to engage the dovetailed edges of said interlocking plates.

In testimony whereof, I hereunto set my hand this 15" day of August 1914.

JOHN KELSEY.

In presence of—
L. C. Brooks,
L. H. McCracken.